Feb. 27, 1951 C. F. LEATHERS 2,543,502
ELECTRICAL CONTROL

Filed Feb. 26, 1945 3 Sheets-Sheet 1

INVENTOR.
Chester F. Leathers.
BY
Harness, Dickey & Pierce
ATTORNEYS.

Feb. 27, 1951  C. F. LEATHERS  2,543,502
ELECTRICAL CONTROL

Filed Feb. 26, 1945  3 Sheets-Sheet 3

INVENTOR.
Chester F. Leathers.
BY
Harness, Dickey & Pierce.
ATTORNEYS.

Patented Feb. 27, 1951

2,543,502

UNITED STATES PATENT OFFICE 2,543,502

ELECTRICAL CONTROL

Chester F. Leathers, Detroit, Mich., assignor to Progressive Welder Company

Application February 26, 1945, Serial No. 579,856

7 Claims. (Cl. 200—144)

The present invention relates to electrical control systems and is principally directed to the provision of improved switching mechanisms for use in such systems. A preferred and illustrative application of the invention is in connection with resistance welding systems of the battery operated type, embodying the invention disclosed and claimed in the co-pending application of Fred H. Johnson and the present applicant, Serial No. 479,998, filed March 22, 1943, which matured into United States Patent No. 2,452,573, dated November 2, 1948.

The principal objects of the present invention are to provide an improved electric switching mechanism which is adapted to handle extremely heavy currents, of the order, for example, of 30,000 to 100,000 amperes, and which is simple and economical to manufacture, and reliable and efficient in operation; to provide such a mechanism which is of the carbon pile type employing a plurality of co-operating pairs of carbon elements which are connected, in parallel with each other, and in series with the circuit to be controlled; to provide such mechanisms wherein the means for controlling pressures between the carbon elements is arranged to effect such control in successive relation; and to provide such mechanisms wherein the position of the conducting members associated with the carbons is such as to minimize electrostatic or magnetic action therebetween.

With the above as well as other and more detailed objects in view, which appear in the following description and in the appended claims, a preferred but illustrative embodiment of the invention is shown in the accompanying drawings, throughout the several views of which corresponding reference characters are used to designate corresponding parts and in which:

It will be appreciated from a complete understanding of the invention that, in a generic sense, the improvements thereof may be embodied in a wide variety of different contactor constructions, adapted for a correspondingly wide variety of different applications. The high current capacity of the present contactor construction, and the correspondingly high current requirements of battery operated resistance welding systems, however, make the improved construction particularly adapted for such systems. In an illustrative but not in a limiting sense, they are so disclosed herein.

Figure 4:
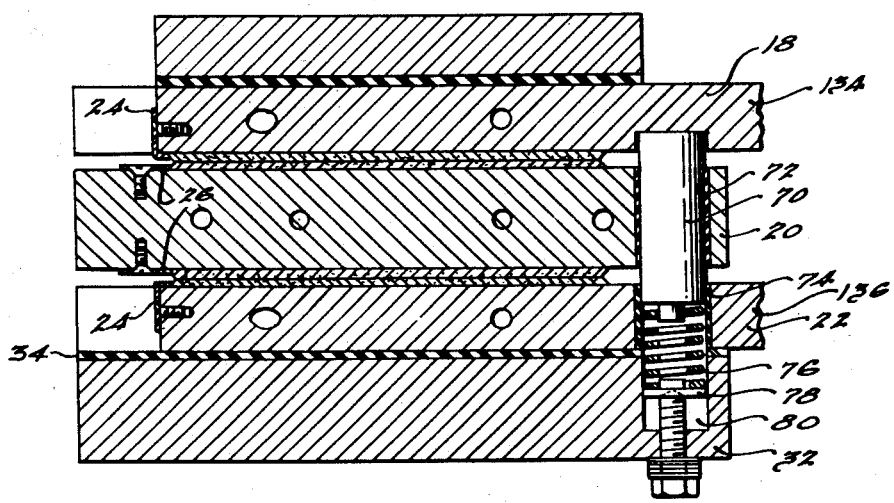
Fig. 4 is a view in vertical section, taken along the offset line 4—4 of Fig. 1.
Figure 5:
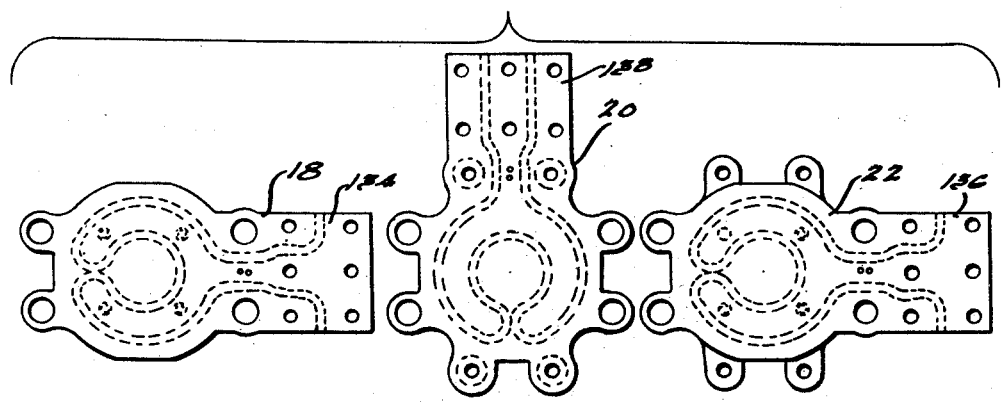
Fig. 5 is an exploded view illustrating the shapes of the carbon elements and the conducting supports therefor.

Referring now to the drawings, the present construction employs a plurality of pairs. specifically two pairs, of co-operating contact elements 10—12 and 14—16, which may be formed of any suitable material, the contact resistance wherebetween is a function of the mechanical pressure applied therebetween. Carbon is a preferred material, and elements 10, 12, 14 and 16 may be, and preferably are, generally circular in form. Carbon 10 is rigidly but releasably secured to a relatively heavy conductive support 18 which may be formed of suitable bus bar material such as copper. Carbons 12 and 14 are similarly secured to similar conductive support 20, and carbon 16 is similarly secured to a similar conductive support 22. As shown in Fig. 4 the carbons are connected to their associated supports by means of a plurality of circumferentially distributed clips as at 24 and 26.

The lower support 22 is rigidly secured, as by a plurality of circumferentially distributed studs 30, to the base plate 32 of the contactor, but is insulated therefrom by usual insulators 34, 36, and 38. Support 18 in turn is similarly secured to but is insulated from a pressure-applying member 40 by means of a plurality of circumferentially distributed studs 42 and insulators 44, 46, and 48.

The intermediate support 20 is yieldably supported on the lower support 22 by means of a plurality, specifically four compression springs 50. These springs surround studs 52 which pass loosely through the support 20, and which are fixed in place with respect to bosses 60 on the support 22 by nuts 54. The springs 50 are seated between the nuts 54 and the underside of the support 20. Nuts 62 serve to limit the upward movement of support 20 relative to the lower support 22, as influenced by the springs 50.

Figure 1:
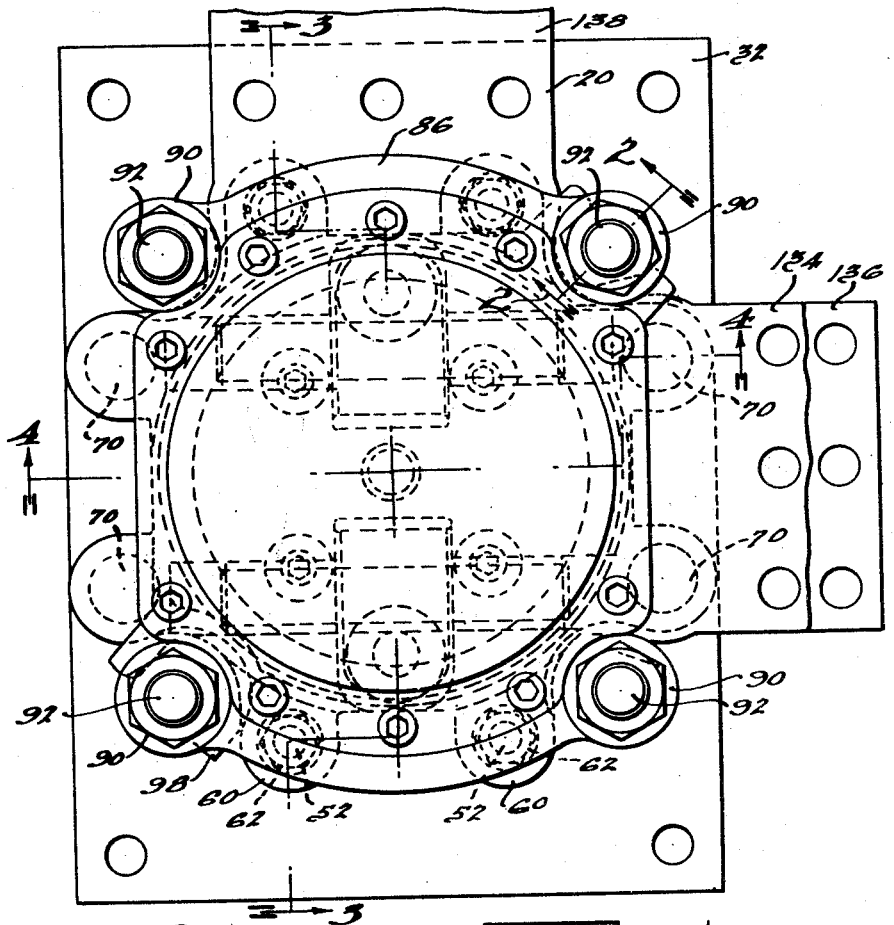
Fig. 1 is a top plan view of an illustrative embodiment of the invention.

As most clearly appears from Figs. 1 and 4, the upper support 18 is provided with a plurality of downwardly projecting posts 70 which pass through guide openings such as 72 provided therefor in the support 20, and are snugly but slidably received in insulating guide sleeves 74 provided therefor in the lower support 22. Springs 76 are seated between the lower ends of posts 70 and washers 78, which are adjustable vertically in recesses 79 provided therefor in the contactor base 32.

It will be appreciated that springs 50 associated with the intermediate support 20 continuously act to urge this support to a position in which carbon 14 is spaced above the cooperating carbon 16. In turn, springs 76 continuously act to urge support 18 to a position in which its carbon 10 is spaced above the cooperating carbon 12. A limit to the upward movement of support 20 is afforded by the previously identified nuts 62, and a limit to the upward movement of support 18 is afforded by engagement between the associated actuating piston 80 with the under side of a rib 82 provided at the upper end of the associated cylinder 84. The parts are shown in the figures in the closed, minimum resistance position thereof, it being understood that the normal condition of the mechanism is one in which the carbons are separated from each other in the just-mentioned manner.

For reasons described hereinafter, springs 50 and 76 are so selected that when the pressure applied by means of the actuating piston 80 is relieved, springs 50 hold carbons 10 and 12 in engagement with each other until after carbons 14 and 16 separate from each other. The separation of carbons 10 and 12 is effected, after the motion of support 20 is interrupted, by the continued movement of the upper support 18.

Figure 2:
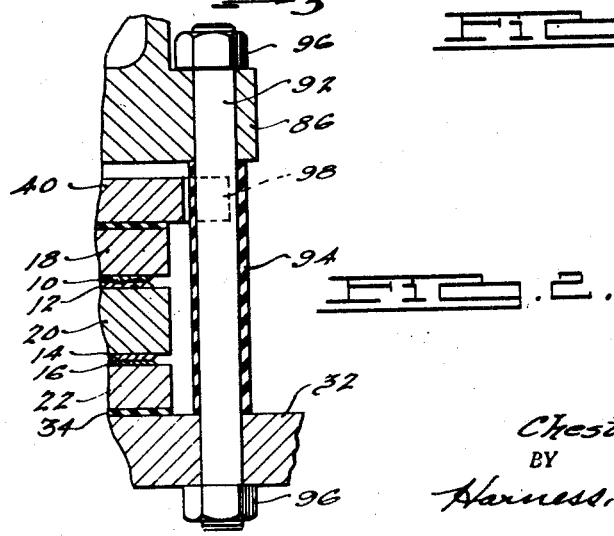
Fig. 2 is a fragmentary view in section, taken along the line 2—2 of Fig. 1.

In the broader aspects of the invention, any of a variety of actuating mechanisms may be utilized to apply, and relieve, pressure between the several pairs of carbons. In the illustrated embodiment, an air operated ram is utilized. More particularly, the present actuating mechanism comprises a generally circular housing member 86, which is surmounted by the previously mentioned downwardly presenting open ended cylinder 84. Members 84 and 86 are rigidly but releasably secured together by a plurality of circumferentially distributed studs 88. Adjacent its lower edge, the housing 86 is provided with a plurality of circumferentially distributed bosses 90 which, as best shown in Figure 2, are apertured to accommodate supporting posts 92 which pass therethrough and through the base 32. Spacers 94 are interrupted between the housing 86 and the base 32, and nuts 96 are applied to maintain the parts in assembled relation to each other.

In addition to supporting the housing 86 in relation to the base 32, the posts 92 and sleeves 94 and also utilized to prevent relative rotative movements between the supports 18—20—22 and the base 32. More particularly, the upper support 18 is provided with U-shaped radial projections 98 which embrace corresponding ones of the sleeves 94 and thus limit such relative rotative movements. It will be recalled that posts 70 maintain supports 20 and 22 in proper rotative relation to support 18.

Housing 86 is provided with a spider-like base structure 100, which defines spaced pairs of bearing openings, to support trunnions 102, associated with bell crank levers 104. These bell crank levers are utilized to transmit the motion of piston 80 to the supports 18 and 20. Each lever 104 is provided in offset relation to its axis of pivotal movement, with a recess 106, which loosely receives a corresponding bearing element 108. Bearing elements 108 are secured to the upper surface of the previously mentioned supporting member 40.

The upper ends 110 of levers 104 are bifurcated, and receive trunnions 112 which rotatably support associated peripherally grooved rollers 114. The peripheries of rollers 114 continuously bear against the tapered cam surface 116 of a cam member 118 which is rigidly secured, by means of the headed stud 120, to the under side of the previously mentioned piston 80. A compression spring 122 which surrounds the piston guide post 124, is seated between the stud 120 and the base 100, and continuously urges piston 80 into engagement with the aforementioned stop 82. The lower end of post 124 is guided in a sleeved opening 126 provided therefor in the base 100.

Figure 6:
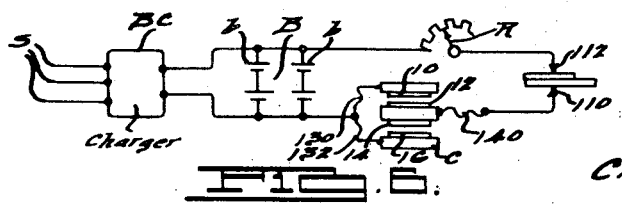
Fig. 6 is an illustrative view of a resistance welding circuit employing the improved contactor of the present invention.

It is believed that the operation of the structure may best be described in connection with the illustrative welding circuit which is diagrammatically shown in Figure 6. In this figure, a storage battery unit, comprising a suitably arranged series of cells $b$, is disposed to receive charging energy from a source S, through a suitable battery charger BC.

Figure 3:
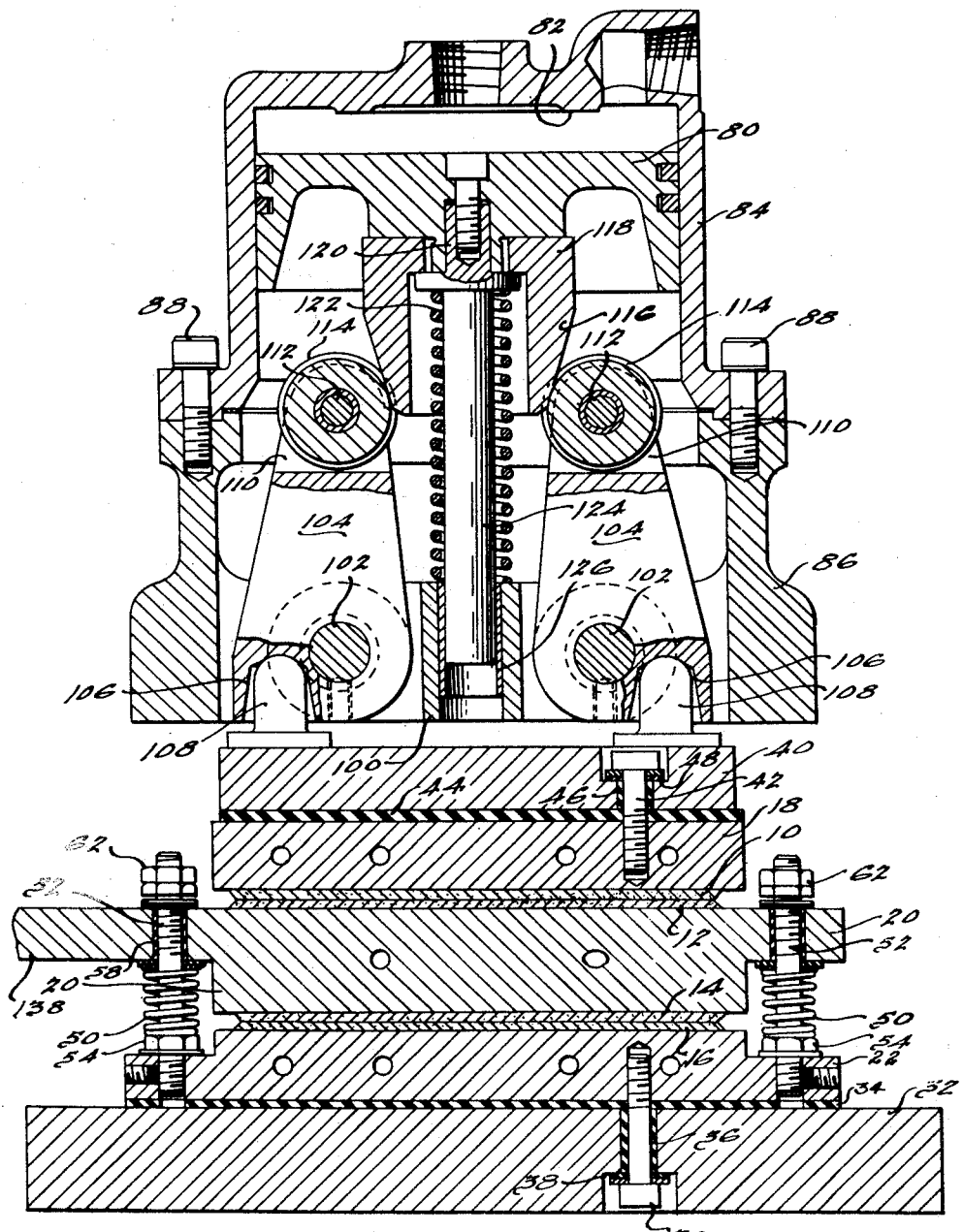
Fig. 3 is a view in vertical section, taken along the offset line 3—3 of Fig. 1.

The battery unit is connected to the illustrative electrodes 110 and 112 of a resistance welding circuit, in series with a suitable regulator R and the previously described normally open contactor C. As previously described, contactor C is provided with the carbons 10, 12, 14, and 16. In the present system, carbons 10 and 16 are continuously connected to each other through flexible connectors 130 and 132, which may be applied respectively to the outwardly projecting terminal portions 134 and 136, of supports 18 and 20, as viewed in Figures 1 and 3. In turn, support 20 is provided with an outwardly projecting terminal 138 which is adapted to be connected, through a flexible bus bar 140, to the corresponding terminal of the welding circuit.

In order to effect a welding operation, and assuming the work has been properly engaged between the electrodes 10 and 12, air or other elastic fluid may be admitted to cylinder 84, above piston 80. Such action forces piston 80 downwardly and, through cam 118, rocks levers 104 in directions to force the bearing elements 108 downwardly. The downward movement of bearing elements 108 carries support 18 downwardly, compressing springs 76. Such downward movement of support 18 causes carbons 10 and 12 to engage each other with a pressure determined by the resistance of springs 50. Such engagement initially establishes the welding circuit and permits a flow of current determined by the contact resistance, at such pressure, of carbons 10 and 12.

Continued movement of piston 80 ultimately brings carbons 14 and 16 into engagement with each other, at a pressure determined by the then existing resistance of springs 50. As soon as this latter engagement is effected, the resistance of the welding circuit is materially reduced, since two parallel carbon pile paths are afforded. This action, of course, increases the flow of welding current.

The downward movement of piston 80 is virtually interrupted, as will be understood, when carbons 14 and 16 engage each other. Following such engagement, the elastic pressure in cylinder 84 continues to build up to the pressure in the associated supply line (not shown). Such increase in pressure is communicated, of course, to the carbons 10—12 and 14—16, and correspondingly reduces the contact resistance therebetween, as will be understood. This action causes the welding current to build up to its maximum value.

It will be appreciated that the initial closure of the welding circuit is followed virtually immediately by the engagement of carbons 14 and 16, and that further, the final build up of carbon pile pressure can be effected at a controlled rate, determined by the characteristics of the cylinder supply circuit. When pressure is relieved from piston 80, on the other hand, springs 50 and 76 act together to promptly elevate the supports 18 and 20, at a rate determined by the rate at which air is vented from cylinder 84. A virtually unrestricted such escape of air is usually preferred, it being noted that in accordance with the present invention of said copending application, it is preferred to control the rate of pressure reduction, in relation to the constants of the welding circuit, so that the welding current is enabled to decrease to a minor fraction of its maximum value before the circuit is physically interrupted by the separation of the last pair of carbon elements.

As previously mentioned also, the characteristics of the springs 50 and 76 are such that springs 50 cause support 20 to follow support 18 and maintain carbons 10 and 12 in engagement until the upward movement of support 20 is interrupted. Thus, carbons 14—16 separate first and carbons 10—12 separate last.

In the present structure, accordingly, changes in resistance of the welding circuit are effected in two manners. One change in resistance is caused by the variation in pressure between engaged carbon elements, and another change in resistance is effected by having one carbon circuit under certain conditions and having a plurality of carbon circuits under certain other conditions. The use of a plurality of pairs of carbon elements will be recognized as permitting a considerably greater total range of resistance change for a given size of carbon area and for a given size of actuating mechanism.

A further feature of the present invention resides in disposing the intermediate support 20 out of alignment with either of the other two supports 18 and 22. Specifically as shown in Figure 1, support 20 is arranged at right angles to supports 18 and 22. This disposition, which disposes electric fields established by the respective supports in right-angled relation to each other, has been found to materially improve the operating characteristics of the structure. Current densities, of the order of 30,000 to 100,000 amperes can be efficiently handled by structures of the present type. Such current densities, even with relatively non-magnetic materials, produce sufficient electrostatic or magnetic inter-action to tend to cause sticking of the plates. Such tendencies are materially reduced by the just-mentioned non-aligned relation of the supports.

Although only a single specific embodiment of the invention has been described in detail, it will be appreciated that various modifications in the form, number, and arrangement of the parts may be made without departing from the spirit and scope of the invention.

What is claimed is:

1. In a contactor, at least two pairs of carbon surfaces arranged in a stack, the outer two surfaces being electrically connected to each other and forming one contactor terminal and the inner two surfaces being electrically connected to each other and forming the other contact terminal, means for applying pressure to the stack to cause the surfaces of the two pairs to engage and form two parallel conducting paths between said terminals, and means normally effective to retain the surfaces of the respective pairs separated from each other and for causing the same to control the circuits therebetween in succession in response to said pressure applying means.

2. In a carbon pile contactor, a supporting structure, a first carbon disk carried by but electrically insulated from said structure, a second carbon disk movably carried by and electrically insulated from said structure, means for moving said second disk into engagement with said first disk comprising a piston and cylinder assembly carried by said structure, rotatable force-transmitting means pivotally carried by said structure and having force-exerting portions operatively connected to said second disk whereby rotation of said force-transmitting means in one direction acts to force said disks into intimate engagement, and cam means carried by said piston and cylinder assembly and movable thereby in one direction for engagement with said force-transmitting means for rotation thereof in said one direction by said assembly, said cam means having limited relative movement in a second direction whereby the forces exerted by said portions are equal.

3. The combination of claim 2 in which each of said force-transmitting means portions comprise a bell-crank lever having a shorter lever arm operatively connected to said second disk and a longer arm engaged by said cam means.

4. In a carbon pile contactor, a base member, a first plate immovably carried by said base member and having a carbon contact surface, a piston and cylinder combination carried by said base member, a second plate having opposed carbon contact surfaces, one of said opposed surfaces being engageable with said first-named surface, a third plate electrically connected to said first plate and having a carbon contact surface engageable with the other of said opposed surfaces, force-multiplying means arranged to multiply the force exerted by said combination and exert this multiplied force for urging said respectively engageable contact surfaces into intimate contact for the passage of electric current therebetween, and resilient means reacting against said base member for urging said second and said third carbon plates in a parting direction from each other and from said first carbon plate.

5. In a carbon pile contactor, a base member, a first plate immovably carried by said base member and having a carbon contact surface, a piston and cylinder combination carried by said base member, a second plate having opposed carbon contact surfaces, one of said opposed surfaces being engageable with said first-named surface, a third plate electrically connected to said first plate and having a carbon contact surface engageable with the other of said opposed surfaces, force-multiplying means arranged to multiply the force exerted by said combination and exert this multiplied force for urging said respectively engageable contact surfaces into intimate contact for the passage of electric current therebetween, and a plurality of sets of equidistantly spaced springs reacting against said base member for respectively urging said second and said third carbon plates in a parting direction from each other and from said first carbon plate.

6. In a carbon pile contactor, a supporting structure, a first member having a contact surface carried by but electrically insulated from said structure, a second member having oppositely arranged contact surfaces movably carried by and electrically insulated from said structure, one of said oppositely arranged surfaces being engageable with said first-named surface to complete an electric circuit, a third member having a contact surface engageable with the other of said oppositely arranged contact surfaces to complete an electric circuit, said third member being movably carried by and electrically insulated from said structure, resilient means interposed between said structure and said second member and urging said second one member in one direction, resilient means interposed between said structure and said third member for urging said third member in said one direction, and cam-actuated force-multiplying means carried by said structure and operatively connected to said third member for urging said second and said third members in a direction other than said one direction.

7. The combination of claim 6 in which said cam-actuated means comprise bell-crank levers fulcrumed on said structure and having short arms operatively connected to said third member and long arms engageable with a cam surface movable with a force exerting means in one direction for rotation of said levers and having limited movement relative to said exerting means in a second direction whereby the forces exerted by said levers are equalized.

CHESTER F. LEATHERS.

REFERENCES CITED

The following references are of record in the file of this patent:

UNITED STATES PATENTS

| Number | Name | Date |
|---|---|---|
| 997,316 | Morse et al. | July 11, 1911 |
| 1,183,264 | Woodrow | May 16, 1916 |
| 1,248,624 | Creveling | Dec. 4, 1917 |
| 1,623,531 | Dubilier | Apr. 5, 1927 |
| 1,705,701 | Austin | Mar. 19, 1929 |
| 1,990,451 | Betz et al. | Feb. 5, 1935 |
| 2,020,911 | Schaelchlin | Nov. 12, 1935 |
| 2,148,472 | Joy | Feb. 28, 1939 |

FOREIGN PATENTS

| Number | Country | Date |
|---|---|---|
| 664,446 | Germany | Aug. 26, 1938 |